E. F. MARRS.
DEVICE FOR INDICATING THE MOVEMENT OF VEHICLES.
APPLICATION FILED NOV. 6, 1913.

1,134,631.

Patented Apr. 6, 1915.

Witnesses
Wm. H. Mulligan,
Wm. E. Valk Jr.

Inventor
Edward F. Marrs,
By Richard Bewen,
his Attorney

UNITED STATES PATENT OFFICE.

EDWARD F. MARRS, OF SAN DIEGO, CALIFORNIA.

DEVICE FOR INDICATING THE MOVEMENT OF VEHICLES.

1,134,631.              Specification of Letters Patent.      Patented Apr. 6, 1915.

Application filed November 6, 1913. Serial No. 799,607.

*To all whom it may concern:*

Be it known that I, EDWARD F. MARRS, citizen of the United States, residing at San Diego, in the county of San Diego and State of California, have invented certain new and useful Improvements in Devices for Indicating the Movement of Vehicles, of which the following is a specification.

The invention relates to an improved device in the nature of a direction indicator, the same being particularly adapted for use in connection with motor and other vehicles, to indicate or signal pedestrians as well as approaching or following vehicles the direction the driver intends to turn the car when passing.

An object of the invention contemplates the provision of means including a pair of indicators, disposed preferably, one near the forward and the other near the rear end of the vehicle, the said indicators being operated simultaneously and at the option of the driver, to indicate as above set forth the direction of travel to be taken, the device being so constructed, that it may be applied to automobiles and other vehicles without changing or modifying the structure thereof to any material extent.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
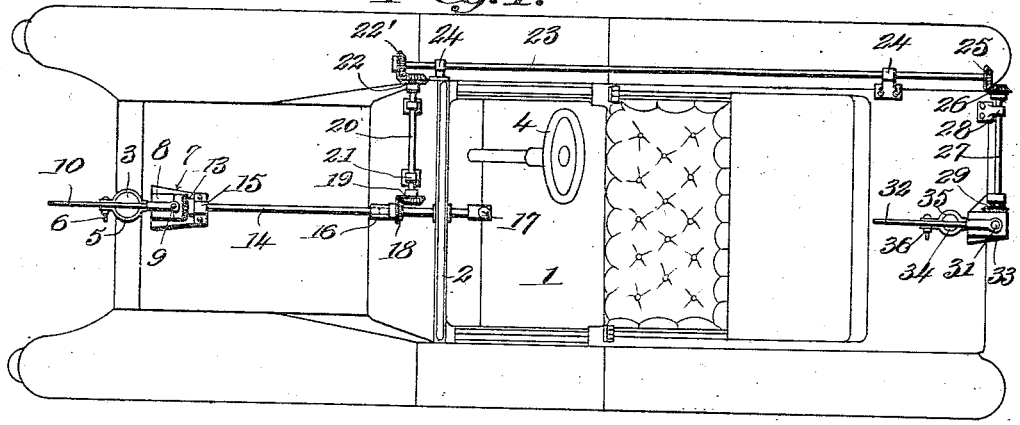
Figure 2:
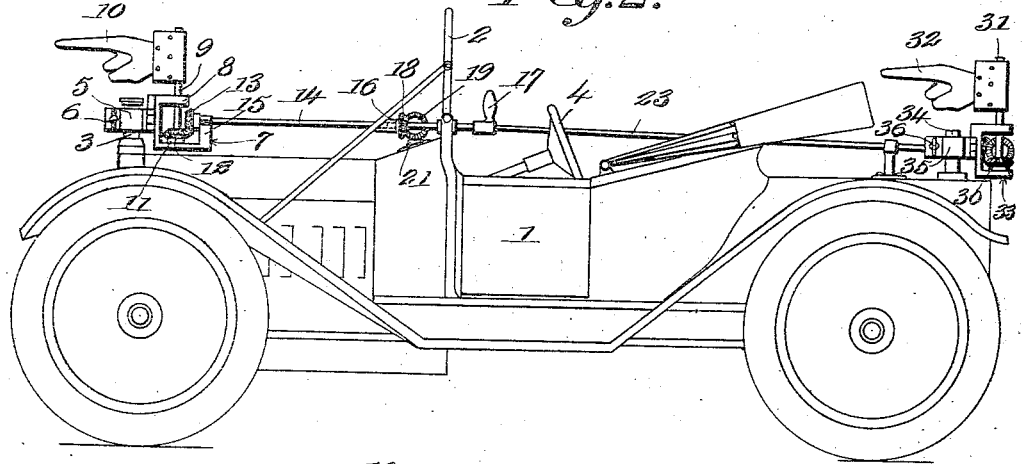
Figure 3:
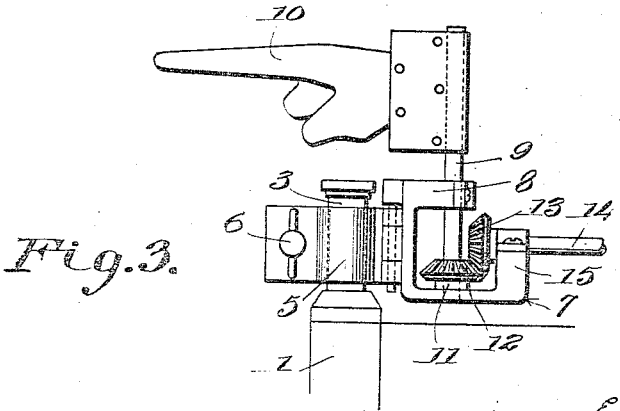

Figure 1 is a top plan view illustrating the application of the invention to a motor vehicle of ordinary construction; Fig. 2 is a side elevation of a device as illustrated in Fig. 1; and Fig. 3 is an enlarged side elevation of one of the indicators and a portion of the operating mechanism indicated therewith.

Before proceeding with the description of the drawings, I desire to call particular attention to the fact that while I have evolved my invention with particular reference to its application in connection with automobiles, the same may be readily utilized or employed in connection with various other vehicles of the road running type.

Referring now to the drawings wherein is illustrated the preferred embodiment of my invention the numeral 1 designates an automobile having the usual wind shield 2, filler plug 3 and steering wheel 4 associated therewith. Detachably secured to the plug 3 through the medium of a clamp 5 and a thumb nut 6, I provide a substantially rectangular bracket 7, within one of the extensions 8 of which a vertically disposed shaft 9 is journaled. Fixedly secured to the said shaft 9 and movable therewith, I provide a hand indicator 10, the indicating point of which is normally in a plane parallel with the longitudinal axis of the automobile. The opposite end of the said shaft 9 is journaled in an enlargement 11 of the said bracket 7 at the base thereof adjacent which point, and mounted for rotation upon the said shaft, I provide a beveled pinion 12 disposed for coaction with a like pinion 13 provided for rotation upon a longitudinally extending operating shaft 14, one end of which is journaled within an upright portion 15 of the bracket 7 and the opposite end in the wind shield 2 at the base thereof, the said shaft being divided intermediate its ends at a point adjacent the wind shield; means in the nature of a sleeve 16 being provided as a coupling for the shaft section, to provide, when uncoupled, for the raising of the hood of the automobile, this being effected by loosening the thumb nut 6 and turning the bracket, the indicator and a portion of the shaft 14 out of a plane parallel with the longitudinal axis of the vehicle. A handle 17 is mounted upon the said operating shaft 14 at a point adjacent the steering wheel 4 at the rear of the wind shield 2, the manipulation of which will actuate the indicator 10 in a manner to be hereinafter fully described.

Mounted upon the shaft 14 at a point adjacent the wind shield 2, and upon the opposite side thereof from that upon which the handle 17 is located, I provide a beveled pinion 18 disposed for engagement with a similar pinion 19 mounted for rotation upon a shaft 20 extending in a direction transverse of the operating shaft 14, the said shaft 20 being journaled within suitable bearings 21 provided therefor. Upon the opposite end of the said shaft 20 is keyed or otherwise fixedly secured a second beveled pinion 22 disposed for engagement with a pinion 22' mounted upon a shaft 23 disposed upon the same plane and in parallel spaced relation with the operating shaft 14, the latter being journaled within bearings 24 arranged to support the said shaft 23 at one side of the vehicle body so as to in no way interfere with the operation of the steering wheel 4.

A beveled pinion 25 is mounted for rotation upon the opposite end of the shaft 23 from that upon which the pinion 22' is mounted, the former meshing into a similar pinion 26 carried by a suitable shaft 27 journaled within bearings 28 supported by the car body at the rear end thereof, the said shaft 27 extending in parallel relation with the shaft 20 above referred to. Upon the opposite end of the shaft 27 a second beveled pinion 29 is mounted, the latter being disposed for engagement with a like pinion 30 mounted upon a vertically extending shaft 31 in duplicate of the shaft 9, the said shaft having an indicator hand 32 fixedly secured thereto, which, with the indicator hand 10 previously referred to, is adapted to indicate to an approaching or following vehicle, the direction in which the driver intends to turn the car. A bracket 33 is provided for the mounting of the shaft 31, the said bracket being the same (or substantially so) in construction as the bracket 7, the support however being provided for, by the arrangement of a stud 34 fixedly secured in any suitable manner to the body of the vehicle at a point adjacent the rear end thereof. A suitable clamp 35 and thumb nut 36 may be provided for supporting the bracket 33 upon the said stud.

When it is desired that the shaft 14 (or the major portion thereof) be swung at an angle to the longitudinal axis of the machine to provide for an opening of the hood, shaft 23 is first bodily moved forwardly until pinion 22' is out of mesh with pinion 22. Shaft 20 is next bodily moved until pinion 19 is out of mesh with pinion 18, in which event the inner section of shaft 14 may be bodily moved until the outer section 14 of the said shaft is free from engagement with the sleeve 16. The sleeve 16 and the outer section 14 of the shaft being disengaged, thumb nut 6 is manipulated to loose the clamp, in which event, the clamp, the bracket 7 and the outer section of the shaft 14 may be bodily moved at a right angle to its normal position whereby to permit unobstructed opening of the hood.

A bracket 7 is hingedly connected to its supporting clamp 5 for the obvious purpose of swinging said bracket out of alinement with the clamp when it is desired that provision be made for an unobstructed opening of the hood without necessitating a manipulation of the thumb screw 6.

Having described fully the construction of the device, it now remains to set forth a little more in detail the operation thereof. The driver of the vehicle, upon noticing the approach of a second vehicle, will, by the manipulation of the handle 17 simultaneously actuate the indicating hands 10 and 32 to convey to the driver of the second car an idea as to which direction he, the first driver, will turn the car when passing. By actuating the said handle 17, the operating shaft 14 is partially rotated for imparting a like movement to the indicator hand 10 as well as the hand 32, the movement of the former being effected through the operation of the pinion 13, pinion 12 and shaft 9, and the operation of the latter by the movement of the shafts 20, 23 and 27 and the gears or pinions carried thereby, taken in connection with the movement of the vertical shaft 31 and the pinion 30 mounted thereon.

From the above, taken in connection with the accompanying drawings, it will be noted that the hood of the automobile may be raised by uncoupling the sections of which the operating shaft 14 is composed and swinging one of the said sections with the bracket 7 and clamp 5 at a right angle to its normal position, this being made possible by the detachable mounting of the said clamp 5 effected by the thumb nut 6 provided therefor; and that the indicator is entirely controlled by the manipulation of the handle 17, the latter being disposed at a convenient point with respect to the seat of the driver.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In an attachment for vehicles, a detachable clamp secured to the vehicle at the forward end thereof, support means movably connected to the said clamp, said support means being normally disposed directly over the hood of the vehicle, a shaft journaled within said support means, an indicator carried by said shaft, an operating shaft journaled within said support means, said operating shaft being journaled at its opposite end in a bearing adjacent the driver's seat, said operating shaft being divided intermediate its ends to form sections, one of the said shaft sections terminating in a sleeve like enlargement arranged to embrace the other of the shaft sections, one of said shaft sections being slidable within its bearing to permit detachment of said shaft sections, said support means with one of said shaft sections being movable with the indicator relatively to the clamp and to the hood to permit opening of the latter when desired, as and for the purpose set forth.

2. In an attachment for vehicles, support means for an indicator mounted on the vehicle directly over the hood, a sectional operating shaft for moving the indicator, said shaft being journaled at one end in said support means and at its opposite end in a bearing disposed adjacent the driver's seat, one of the shaft sections being slidable relatively to its bearing, a sleeve-like enlargement formed upon the slidable shaft section into which the other of the said shaft sections is fitted, said shaft sections when disengaged permitting pivotal movement of the support means laterally of the hood to provide for an opening thereof, as and for the purpose set forth.

In testimony whereof I affix my signature in presence of two witnesses.

EDWARD F. MARRS.

Witnesses:
  H. E. ANTHONY,
  O. AUSRAD.